Figure 1:
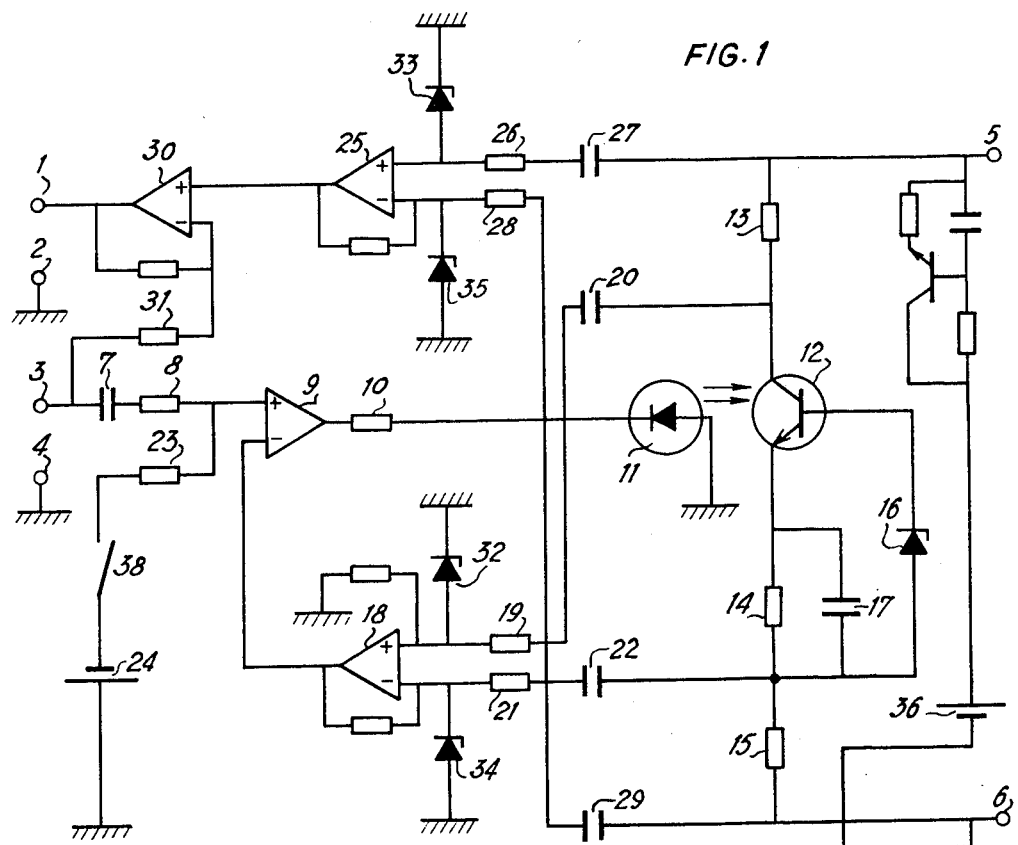

United States Patent [19]

Picandet

[11] 4,039,766
[45] Aug. 2, 1977

[54] ELECTRIC TWO-TO-FOUR WIRE CONVERSION CIRCUIT FOR USE IN TELEPHONE SYSTEMS

[75] Inventor: Jean A. Picandet, Paris, France
[73] Assignee: Jeumont-Schneider, Puteaux, France
[21] Appl. No.: 667,838
[22] Filed: Mar. 17, 1976
[30] Foreign Application Priority Data
Mar. 20, 1975 France .................................. 75.08696
[51] Int. Cl.² .............................................. H04B 1/58
[52] U.S. Cl. .............................................. 179/170 NC
[58] Field of Search ......... 179/170 NC, 170 R, 170 T
[56] References Cited
U.S. PATENT DOCUMENTS
3,987,257  10/1976  Place .............................. 179/170 NC Primary Examiner—Kathleen H. Claffy
Assistant Examiner—Randall P. Myers
Attorney, Agent, or Firm—Bacon & Thomas

[57] ABSTRACT

An electronic replacement for a telephone transformer for connecting a two-wire circuit to a four-wire circuit comprises a first differential amplifier having a constant gain feedback loop. The feedback loop comprises an opto-electronic coupler and a second differential amplifier. A DC source connected to the first differential amplifier by a switch produces biasing current for a photo transistor in the opto-electronic coupler. A DC supply to the line on the two-wire side is provided by a source connected to the wires by transistor circuits connected as active reactances.

17 Claims, 2 Drawing Figures

ELECTRIC TWO-TO-FOUR WIRE CONVERSION CIRCUIT FOR USE IN TELEPHONE SYSTEMS

The invention relates to an electronic terminating set for use in telephony for connecting a two-wire circuit to a four-wire circuit.

It is known that a connection of this kind can be provided by a two-winding transformer or "telephone transformer", but the transformer is heavy, bulky and expensive particularly since in certain applications one of its windings is flowed through by d.c., which necessitates an increase in size.

The electronic terminating set according to the invention does not have the aforementioned disadvantages since it is light, compact and less expensive than a telephone transformer.

It is characterised firstly in that the transmitting circuit on the four-wire side comprises a first differential amplifier in series with an opto-electrical coupler comprising an electroluminescent diode associated with a phototransistor, the amplifier having a constant-gain feedback loop comprising two capacitors connected at one end to the phototransistor input and output respectively and at the other end to one input of a second differential amplifier whose output is connected to the negative input of the first amplifier.

Secondly, it is characterised in that a d.c. source is applied to the positive input of the first amplifier to produce a bias current in the phototransistor, which has a negative feedback resistor in its emitter circuit, a Zener diode in its base circuit and a decoupling capacitor at the terminals of the resistor.

Thirdly, it is characterised in that the receiving circuit on the four-wire side comprises two blocking capacitors connected at one end to one of the wires of the line on the two-wire side and at the other end to one input of a third differential amplifier whose output is connected to the first input of a fourth differential amplifier, the other input of which is connected to the input of the transmitting circuit.

Figure 2:
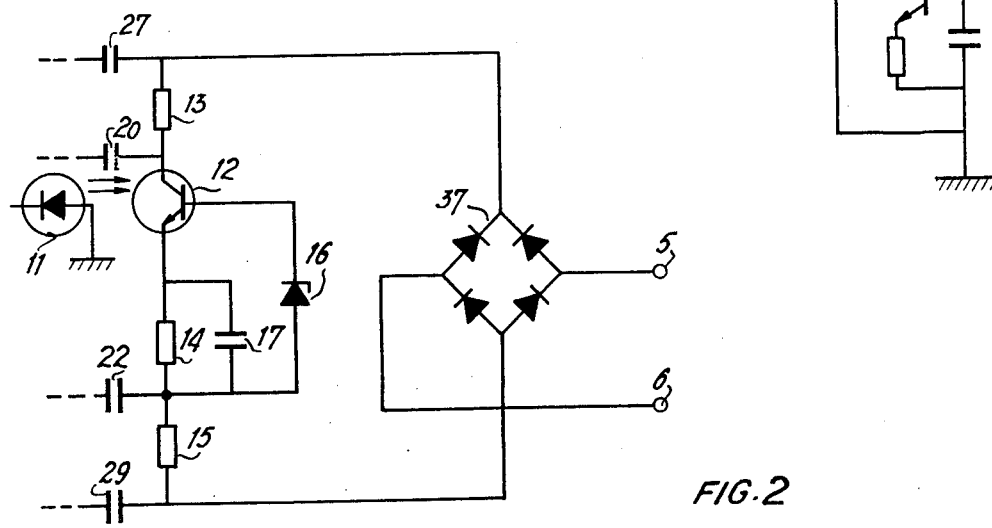

The invention will be more easily understood from the following embodiment, which relates to telephony, and the accompanying drawings in which:

FIG. 1 represents the electric circuit of a terminating set according to the invention, and FIG. 2 shows a variant of the right part of FIG. 1, relating to the d.c. supply to the line on the two-wire side.

FIG. 1 shows a terminating set which, on the four-wire side, is limited by terminals 1-4 which are connected e.g. to the automatic switch of a telephone exchange, terminals 1 and 2 corresponding to the transmitting circuit and terminals 3, 4 corresponding to the receiving circuit. On the two-wire side, the terminating set is limited by terminals 5, 6, which are connected e.g. to a subscriber's telephone set.

Starting from terminal 3, the receiving circuit comprises a capacitor 7 in series with a resistor 8 connected to the positive input of a differential amplifier 9 whose output is connected via a resistor 10 to an electroluminescent diode 11, the output of which is earthed. Diode 11 acts by the photoelectric effect to an NPN type phototransistor 12 having a collector connected via a resistor 13 to terminal 5, an emitter connected via two resistors 14, 15 in series to terminal 6, and a base connected via a Zener diode 16 to the series connection between resistors 14 and 15. A capacitor 17 is connected to the terminals of resistor 14. A differential amplifier 18 has a positive input connected via a resistor 19 in series with a capacitor 20 to the collector of phototransistor 12 and a negative input connected via a resistor 21 in series with a capacitor 22 to the series connection between resistors 14 and 15. The output of amplifier 18 is connected to the negative input of amplifier 9.

The circuit 9-10-11-12-20-19-22-21 and 18 comprises a constant-gain feedback loop for amplifier 9, the positive input of which is connected via a resistor 23 in series with a switch 38 to the negative terminal of a d.c. source 24 for producing a bias current in the phototransistor 12, the positive terminal of source 24 being earthed. Capacitors 20, 22 protect the feedback loop from d.c. components coming from the line connected at 5 and 6.

The transmitting circuit comprises a differential amplifier 25 having a positive input connected to terminal 5 via a resistor 26 in series with a capacitor 27, a negative input connected to terminal 6 via a resistor 28 in series with a capacitor 29, and an output connected to the positive input of a differential amplifier 30. The output of amplifier 30 is connected to terminal 1, whereas its negative input is connected to terminal 3 via a resistor 31.

The positive inputs of amplifiers 18, 25 are earthed via Zener diodes 32, 33 respectively, the cathodes of which are earthed.

The negative inputs of amplifiers 18, 25 are similarly connected to earth via Zener diodes 34, 35 respectively, the anodes of which are earthed.

As shown in FIG. 1, direct current can be supplied to the telephone line by terminals 5, 6 via a d.c. source 36 whose positive and negative terminals are connected to terminals 5, 6 respectively via a transistor circuit connected as an active reactance according to U.S. patent application Ser. No. 572,724 filed Apr. 29, 1975 by the Applicants and entitled "A d.c. supply system for a telephone line".

FIG. 2 illustrates another method of supplying direct current to the telephone line. The left part of the diagram is identical with the left part of FIG. 1. A double full wave rectifier 37 has a positive terminal connected to the connection between 13 and 27 and a negative terminal connected to the connection between 15 and 29, whereas its a.c. inputs are connected to terminals 5 and 6 respectively. System 37 protects the entire terminating-set circuit from battery reversals.

Irrespective of whether the circuit in FIG. 1 or FIG. 2 is used, the terminating set operates as follows:

With regard to the receiving circuit, when switch 38 is closed, the d.c. produced by 24 travels through diode 11, which becomes luminescent, producing a control current in the base of phototransistor 12.

Diode 16 and resistor 14 define a receiving current having a given value which is substantially independent of the characteristics of the opto-electrical coupler 11-12, any excess base current from 12 flowing away through 16. Capacitor 17 is used for low-frequency decoupling.

The low-frequency gain of amplifier 9 is stabilized by negative feedback applied by connections 20-19 and 22-21 to the inputs of amplifier 18.

A low-frequency signal applied between terminals 5 and 6 produces voltage fluctuations at the terminals of resistors 13 and 15, a part of the voltages being applied to the inputs of amplifier 25 via connections 27-26 and 29-28 respectively.

Consequently, the output of 25 delivers transmission and reception signals to the positive input of 30, but the resistor 31 connecting terminal 3 to the negative input of 30 is made such that amplifier 30 outputs only the transmission circuit signal.

Resistor 31, which also has a balancing function, may alternatively be replaced by an impedance.

Capacitors 20, 22, 27, 29 have a high blocking voltage but a low capacity and are therefore compact. They prevent a d.c. component from flowing through.

Zener diodes 32-33-34-35 can be used to protect amplifiers 18 and 25 against line overvoltages.

The loop can be closed applying a d.c. source 24 to the positive input of 9, thus producing a current in phototransistor 12.

I claim:

1. An electronic two-to-four wire conversion set for use in telephony having a receiving and a transmitting circuit on the four-wire side thereof, characterized in that the receiving circuit on the four-wire side comprises a positive input of a first differential amplifier in series with an opto-electrical coupler comprising an electroluminescent diode associated with a phototransistor having an input and an output, the amplifier having a negative input connected to a constant-gain feedback loop comprising two blocking capacitors connected at one end to the phototransistor input and output respectively and at the other end to positive and negative inputs respectively of a second differential amplifier having an output connected to the negative input of the first amplifier, also characterized in that a d.c. source is applied to the positive input of the first amplifier to produce a bias current in the phototransistor, which has a negative feedback resistor in its emitter circuit, a Zener diode in its base circuit and a decoupling capacitor at terminals of the resistor, ends of the input-output circuit of the phototransistor being respectively connected to the terminals of the two-wire side, the conversion set further comprising means connecting said transmitting circuit to said two-wire side for transmitting signals fed from said two-wire side thereby.

2. An electronic two-to-four wire conversion set according to claim 1, characterized in that the transmitting circuit on the four-wire side comprises two blocking capacitors connected respectively at one end to a first and second wires of the line on the two-wire side and at the other end to the positive and negative inputs respectively of a third differential amplifier having an output connected to a positive input of a fourth differential amplifier, a negative input of which is connected to an input of the receiving circuit.

3. An electronic two-to-four wire conversion set according to claim 1, characterised in that the d.c. supply to the line on the two-wire side is by means of a d.c. source, each terminal of which is connected to one terminal of the aforementioned line by a transistor circuit connected as an active reactance.

4. An electronic two-to-four wire conversion set according to claim 1, characterised in that the d.c. supply to the line on the two-wire side is via a full wave rectifier.

5. In an electronic two-to-four-wire conversion circuit for use in telephone systems and having receiving and transmitting circuits on the four-wire side thereof connected to the two-wire side thereof, the improvement comprising, in said receiving circuit:

a first differential amplifying means for receiving a signal in said receiving circuit having a constant gain feedback loop, said feedback loop comprising a opto-electronic coupling means receiving the output of said first differential amplifying means for coupling said output to the two-wire side.

6. The conversion circuit recited in claim 5 further comprising a voltage source switchably connected to an input of said first differential amplifying means for providing biasing current for said opto-electronic coupling means.

7. The conversion circuit recited in claim 5 wherein said feedback loop further comprises:

second differential amplifying means receiving input signals from said opto-electronic coupling means;

said second differential amplifying means providing a signal for input to said first differential amplifying means.

8. The conversion circuit recited in claim 7 wherein said second differential amplifying means has two input terminals, each input being connected to a ground point by a Zener diode.

9. The conversion circuit recited in claim 7 wherein said opto-electronic coupling means comprises a phototransistor having an emitter, a base and a collector, said collector being connected to a first of said two wires and to a first of said second differential amplifier input terminals, said emitter being connected to a second of said two wires and to a second of said second differential amplifying means input terminals.

10. A conversion system as recited in claim 9 further comprising current stabilizing means for providing a receiving current substantially independent of characteristics of said opto-electronic coupling means.

11. A conversion system as recited in claim 10 wherein said current stabilizing means comprises a diode and a resistance means connected between said base and said emitter of said phototransistor.

12. A conversion circuit as recited in claim 9 further comprising first and second capacitance means connecting said collector and said emitter to said second differential amplifying means for blocking DC input from said two wires to said second differential amplifying means.

13. Conversion circuit as recited in claim 12 wherein said first and second capacitance means are connected to said second differential amplifying means through a first and second resistance means, respectively, said first and second capacative means and said first and second resistance means stabilizing a low frequency characteristic of said first differential amplifying means.

14. A conversion circuit as recited in claim 7 further comprising third and fourth differential amplifying means for receiving signal from said two-wire side and providing signals to said transmitting circuit.

15. A conversion circuit as recited in claim 14 wherein said third differential amplifying means has two input terminals, each input terminal being connected to a ground point through Zener diodes, each input terminal to said third differentialamplifying means receiving a signal from one wire on said two-wire side through a capacitance means and a resistance means.

16. A conversion circuit as recited in claim 5 further comprising a voltage source for said two-wire side, said voltage source having two terminals, each of of said two terminals being connected to one wire of said two-wire side through an active reactance circuit.

17. A conversion circuit as recited in claim 5 further comprising a full wave rectifying bridge for providing DC supply to said two-wire side.

* * * * *